(12) United States Patent
Lundstrom et al.

(10) Patent No.: US 11,701,714 B2
(45) Date of Patent: Jul. 18, 2023

(54) METHOD OF MACHINING A GROOVE

(71) Applicant: SANDVIK INTELLECTUAL PROPERTY AB, Sandviken (SE)

(72) Inventors: Staffan Lundstrom, Gavle (SE); Johan Anderstedt, Sandviken (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 0 days.

(21) Appl. No.: 16/482,997

(22) PCT Filed: Aug. 17, 2017

(86) PCT No.: PCT/EP2017/070860
§ 371 (c)(1),
(2) Date: Aug. 1, 2019

(87) PCT Pub. No.: WO2018/082821
PCT Pub. Date: May 11, 2018

(65) Prior Publication Data
US 2019/0358710 A1    Nov. 28, 2019

(30) Foreign Application Priority Data
Feb. 3, 2017 (EP) .................... 17154538

(51) Int. Cl.
*B23B 27/08* (2006.01)
*B23B 27/04* (2006.01)
*B23B 29/04* (2006.01)

(52) U.S. Cl.
CPC .......... *B23B 27/086* (2013.01); *B23B 29/043* (2013.01); *B23B 2205/02* (2013.01); *B23B 2220/12* (2013.01)

(58) Field of Classification Search
CPC ..... B23B 29/043; B23B 27/08; B23B 27/086; B23B 2220/12; B23B 2205/02;
(Continued)

(56) References Cited

U.S. PATENT DOCUMENTS

| 1,636,898 A | * | 7/1927 | Bugatti | .................. B23B 29/04 82/158 |
| 1,986,587 A | * | 1/1935 | Ludington | ................ B23B 5/14 82/47 |

(Continued)

FOREIGN PATENT DOCUMENTS

| CH | 646888 A5 * 12/1984 |
| CN | 101602110 A   12/2009 |

(Continued)

*Primary Examiner* — Ryan Rufo
(74) *Attorney, Agent, or Firm* — Corinne R. Gorski

(57) ABSTRACT

A method for cutting a groove of a predetermined groove width in a work piece, including the steps of providing a metallic work piece having a peripheral surface; providing a grooving tool including a blade portion having a constant or substantially constant blade width, and an insert having a maximum insert width defined by a main cutting edge; selecting the insert width to be greater than the blade width; connecting the grooving tool to a machine interface of a machine tool; rotating the work piece about a rotational axis thereof in a rotational direction; and cutting a groove in the work piece by moving the tool in a feed direction towards the rotational axis of the work piece, such that the groove width is equal to or substantially equal to the insert width and such that a tangential cutting force is directed towards or substantially towards the machine interface.

12 Claims, 4 Drawing Sheets

(58) Field of Classification Search
CPC ..... B23B 27/083; B23B 27/04; B23B 27/045; B23B 29/04; B23B 2210/022; B23B 2210/025; B23B 2220/126; B23B 2220/28; B23B 5/14

See application file for complete search history.

(56) References Cited

U.S. PATENT DOCUMENTS

| | | | | |
|---|---|---|---|---|
| 2,335,570 | A * | 11/1943 | Montgomery | B23B 27/08 407/113 |
| 2,353,913 | A * | 7/1944 | Luers | B23B 29/043 407/64 |
| 2,836,240 | A * | 5/1958 | Nuding | B23B 27/08 407/118 |
| 2,979,805 | A * | 4/1961 | Johnson | B23B 27/08 407/113 |
| 3,062,080 | A * | 11/1962 | Kurtz | B23B 29/04 82/158 |
| 3,172,191 | A | 3/1965 | Franz et al. | |
| 3,230,802 | A * | 1/1966 | Johnson | B23Q 11/10 82/158 |
| 3,371,567 | A | 3/1968 | Davis | |
| 3,497,935 | A * | 3/1970 | Bowling | B23B 27/04 407/108 |
| 3,551,977 | A | 1/1971 | Nokov | |
| 3,691,884 | A * | 9/1972 | Lindgren | B23B 29/06 82/158 |
| 3,775,817 | A * | 12/1973 | Hertel | B23B 29/046 407/5 |
| 4,035,889 | A * | 7/1977 | McCreery | B23B 29/043 407/117 |
| 4,167,129 | A | 9/1979 | Leunissen | |
| 4,213,356 | A | 7/1980 | Armitage | |
| 4,223,576 | A * | 9/1980 | Donnelly | B23B 27/04 82/47 |
| 4,930,199 | A | 6/1990 | Yanagisawa | |
| 4,938,641 | A | 7/1990 | Maier | |
| 5,031,492 | A * | 7/1991 | Zinner | B23B 29/043 82/158 |
| 5,079,979 | A * | 1/1992 | Pano | B23B 29/043 82/158 |
| 5,135,336 | A | 8/1992 | Noguchi et al. | |
| 5,150,992 | A | 9/1992 | Friedmann et al. | |
| 5,791,214 | A | 8/1998 | Svenson | |
| RE37,595 | E | 3/2002 | Lindstedt | |
| 6,568,303 | B1 * | 5/2003 | Bentley | B23B 5/14 82/47 |
| 6,715,386 | B2 * | 4/2004 | Maier | B23B 3/164 82/1.11 |
| 7,219,584 | B2 † | 5/2007 | Edler | |
| 7,331,736 | B2 * | 2/2008 | Nicholas | B23B 29/043 407/91 |
| 7,416,372 | B2 * | 8/2008 | Hyatt | B23B 1/00 29/889 |
| 8,021,084 | B2 * | 9/2011 | Hecht | B23B 27/1622 407/103 |
| 8,234,958 | B2 † | 8/2012 | Hyatt | |
| 8,246,277 | B2 * | 8/2012 | Hecht | B23B 27/04 407/85 |
| 8,827,598 | B2 | 9/2014 | Henry et al. | |
| 9,403,214 | B2 | 8/2016 | Hecht | |
| 9,475,122 | B2 | 10/2016 | Andersson et al. | |
| 9,656,324 | B2 | 5/2017 | Boissonnet et al. | |
| 10,052,693 | B2 | 8/2018 | Kurokawa | |
| 2002/0170396 | A1 | 11/2002 | Maier | |
| 2004/0060402 | A1 * | 4/2004 | Shimada | B23Q 11/10 82/124 |
| 2006/0075858 | A1 * | 4/2006 | Edler | B23B 29/242 82/121 |
| 2006/0111019 | A1 | 5/2006 | Hyatt et al. | |
| 2006/0230889 | A1 * | 10/2006 | Kimura | B23B 1/00 82/1.11 |
| 2011/0142562 | A1 * | 6/2011 | Sturges | B23C 1/06 409/131 |
| 2015/0003921 | A1 | 1/2015 | Andersson et al. | |
| 2022/0016717 | A1 | 1/2022 | Hecht et al. | |
| 2023/0001488 | A1 | 1/2023 | Shimanuki et al. | |

FOREIGN PATENT DOCUMENTS

| | | | |
|---|---|---|---|
| CN | 203843202 U | 9/2014 | |
| DE | 102007057157 A1 * | 5/2009 | ............ B23B 29/04 |
| EP | 0300544 A2 * | 1/1989 | |
| EP | 2821167 A1 | 1/2015 | |
| EP | 3095541 A1 | 1/2015 | |
| FR | 976906 A * | 3/1951 | ............ B23B 27/08 |
| GB | 1255494 A * | 12/1971 | |
| GB | 1412490 A * | 11/1975 | ............ B23B 29/04 |
| JP | S4112709 Y1 | 6/1966 | |
| JP | S5380080 A | 7/1978 | |
| JP | 06297210 A | 10/1994 | |
| JP | 37032897 B2 | 11/1999 | |
| JP | 200218605 A | 1/2002 | |
| JP | 4012670 A | 9/2007 | |
| SU | 1074660 A1 * | 2/1984 | |
| WO | 96/10464 A1 | 4/1996 | |
| WO | WO-2004022270 A1 * | 3/2004 | ............ B23B 27/14 |

\* cited by examiner
† cited by third party

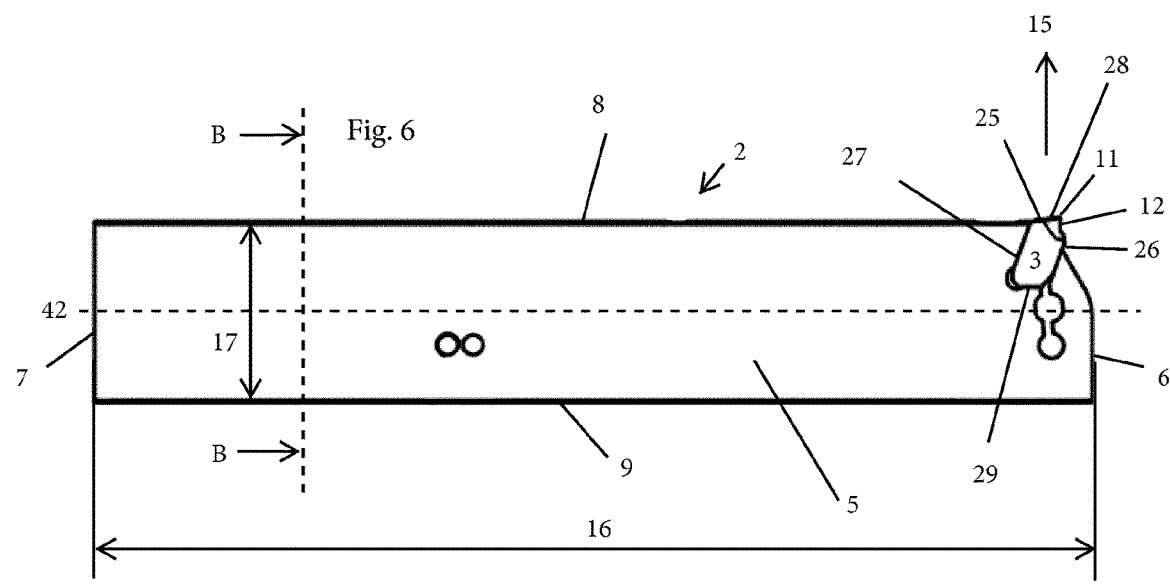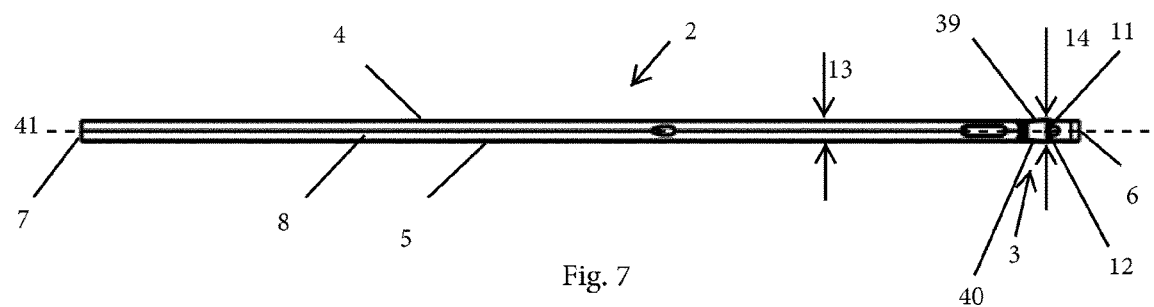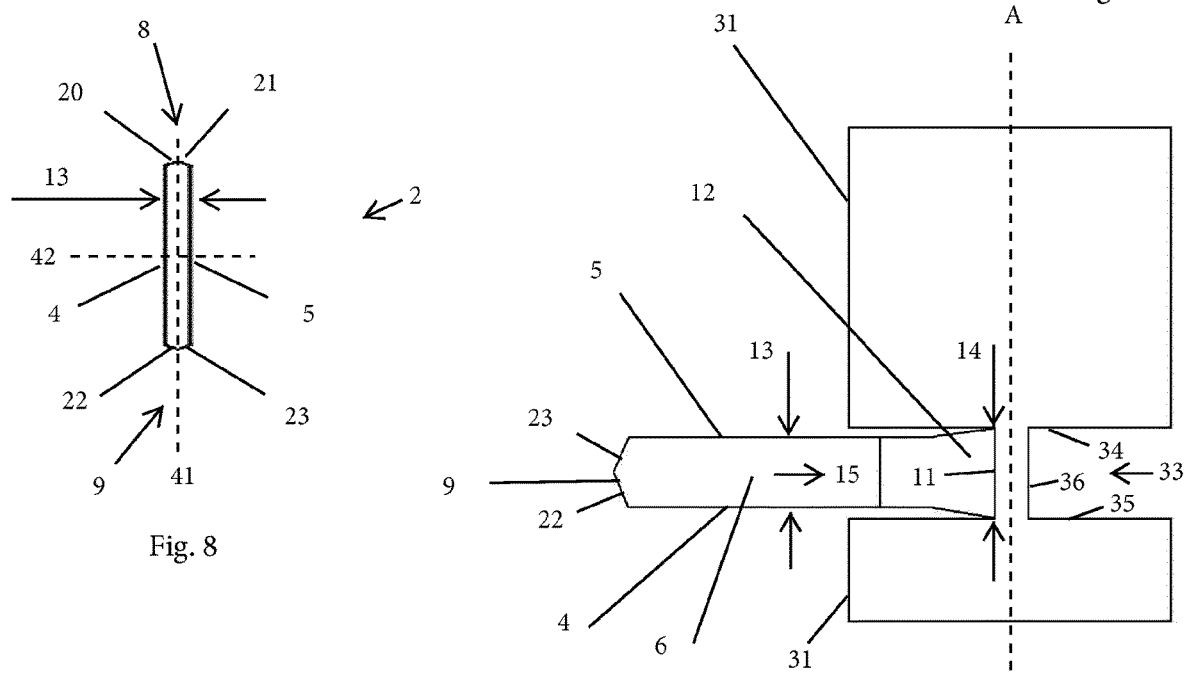

METHOD OF MACHINING A GROOVE

RELATED APPLICATION DATA

This application is a § 371 National Stage Application of PCT International Application No. PCT/EP2017/070860 filed Aug. 17, 2017 claiming priority to EP 17154538.7 filed Feb. 3, 2017.

TECHNICAL FIELD OF THE INVENTION

The present invention belongs to the technical field of metal cutting tools. More specifically the present invention belongs to the field of methods for cutting a groove of a predetermined groove width in a work piece, Such machining can be made using computer or computerized numerical control, i.e. CNC, machines.

BACKGROUND OF THE INVENTION AND PRIOR ART

The present invention refers to methods for cutting a groove of a predetermined groove width in a work piece. More specifically, the present invention relates to a turning method, using a cutting tool comprising a replaceable cutting insert, more specifically a parting, cutting-off or grooving insert.

Metal cutting parting-off, cutting-off or deep grooving, have long been known to be a difficult operation. Chip jamming have been known to be one problem. One other problem is vibrations, causing risk of tool breakage and poor surface finish, among other things. Such an operation and cutting tool is described in e.g. U.S. Pat. No. 5,135,336, FIG. 4. There is thus a long-felt need to reduce vibrations in parting-off or deep grooving operations.

SUMMARY OF THE INVENTION

The inventors have found that there is a need for an improved method in order to reduce the risk of vibrations in deep grooving or parting-off. The inventors have found that the in state of the art methods, vibrations may be caused be deflection of the cutting tool during cutting.

An object of the present invention is to provide a method for cutting a groove of a predetermined groove width in a work piece which reduces vibrations.

This object is achieved with a method comprising the steps of: providing a metallic work piece having a peripheral surface; providing a grooving tool comprising a blade portion having a constant or substantially constant blade width, and an insert having a maximum insert width defined by a main cutting edge; selecting the insert width to be greater than the blade width; connecting the grooving tool to a machine interface of a machine tool; rotating the work piece about a rotational axis thereof in a rotational direction; cutting a groove in the work piece by moving the tool in a feed direction towards the rotational axis of the work piece such that the groove width is equal to or substantially equal to the insert width and such that a tangential cutting force is directed towards or substantially towards the machine interface.

By such a method, the risk of vibrations during deep grooving or parting-off can be reduced. Further effects may be possibility to increase the feed rate, choosing a smaller insert width, improved surface finish, and reduced insert wear. By such a method, the deflection of the insert during cutting may be reduced, especially when the overhang, or maximum grooving depth of the grooving tool, is great. Comparative experiments or calculation have shown examples of 6 times less deflection. Such a method is preferably used in a machine tool or computer (or computerized) numeric control (CNC) machine having y-axis capability, such as a multi-task machines or a mill-turn machines.

The method for cutting a groove of a predetermined groove width in a work piece is a turning method, i.e. a method where a work piece rotates around a rotational axis, and where exactly one insert cuts material. The groove formed is perpendicular to the rotational axis. Alternatively, in a parting-off operation, a groove is formed until the work piece is divided into two pieces.

A metallic work piece, such as a work piece made from steel, is provided having a peripheral surface, or an external surface. The metallic work piece may be cylindrical or symmetrical in relation to a center axis, which center axis coincides with the rotational axis. The peripheral surface is preferably formed at a constant or substantially constant diameter.

The rotational axis may preferably be horizontal. Alternatively, depending on e.g. machine type, the rotational axis may be vertical. Alternatively, but not preferably, the rotational axis may have any other angle.

A grooving tool, or a tool suitable for grooving or parting-off, is provided, comprising a blade portion having a constant or substantially constant blade width preferable within the range of 1.0-20.0 mm, even more preferably within the range of 1.5-12.0 mm., and an insert having a maximum insert width defined by a main cutting edge.

The blade portion may be a singular body, entity or device. Alternatively, the blade portion may a part or a portion of a singular body, entity or device.

The insert is preferably made from a more wear resistant material than the blade portion, such as cemented carbide, cermet or ceramics, or a combination of such materials. The blade portion is preferably made from steel.

The main cutting edge defines an insert width. In grooving, the groove width is equal to the insert width, i.e. the width of the main cutting edge. The main cutting edge is the widest portion of the insert, in other words, a straight line connecting the opposite end points of the main cutting edge is equally long or preferably longer than all parallel lines having end-points thereof intersecting the insert.

The insert width is greater than the blade width. Preferably the insert width is 1-25% wider, even more preferably 5-15% wider, than the blade width. The insert width and the blade width are measured along parallel lines.

The grooving tool is preferably arranged such that a grooving operation can be performed such that the entire insert can be inside the groove.

The grooving tool is connected or clamped, directly or indirectly, to a machine interface of a machine tool, preferably by means of a coupling portion. The coupling portion is suitable to be connected to a machine tool which can be used for turning and grooving, such as a turning lathe, a multi task machine, a turn-mill machine, or a sliding head machine. The machine tool is preferably a CNC, i.e. computer or computerized numerical control, machine. The coupling portion is suitable to be connected to the machine interface, which can be in the form of a machine spindle or a tool revolver turret or a tool post. The coupling portion may have a square or rectangular shape in a cross section. The coupling portion may be conical or substantially conical, such as preferably according to ISO standard 26623-1.

The work piece is rotated or driven, preferably by a motor which is part of the machine tool, about a rotational axis thereof in a rotational direction. A groove in the work piece is formed by cutting. The tool is moved in a feed direction, through radial feed, towards the rotational axis of the work piece. Moving of the tool relative to the work piece is preferably linear or straight. The radial feed is preferably within the range of 0.05-0.50 mm/revolution. The radial feed may be constant during cutting. Alternatively, the radial feed may vary, preferably such that the radial feed is decreased at the end of the cut. The feed direction is perpendicular to rotational axis.

The groove width is equal to or substantially equal to, i.e. determined by, the insert width. The main cutting edge is preferably parallel to the rational axis. The main cutting edge is preferably parallel to the rational axis. Alternatively the main cutting edge forms an angle less than 20 degrees, even more preferably less than 10 degrees, in relation to the rotational axis. The main cutting edge may be straight or linear. Alternatively, the main cutting edge may in a front view comprise a central depression.

A tangential cutting force, or a main cutting force, is directed towards or substantially towards the machine interface. A radial cutting force, or a feed force is directed in an opposite or substantially opposite direction in relation to the feed direction. The radial cutting force, or the feed force is directed perpendicular to or substantially perpendicular to the tangential or main cutting force.

The moving the tool may be such that the main cutting edge intersects or substantially intersects the rotational axis. Alternatively, the moving the tool may be such that the radial feed stops before the main cutting edge has reached the rotational axis.

According to an embodiment, the method according includes the further step of moving the tool such that the main cutting edge intersects or substantially intersects the rotational axis.

By such a method, a parting or parting-off operation can be performed, if the work piece is a bar or is shaped such that the work piece do not comprise a central hole intersecting the feed direction.

The main cutting edge is moved such that the main cutting edge intersects or substantially intersects, i.e. within 2.0 mm from or even more preferably within 2.0 mm from, the rotational axis.

According to an embodiment, the method according includes the further step of moving the tool such that the main cutting edge is moved along a straight path towards the rotational axis.

By such a method, programming of the method can be made in a short time.

According to an embodiment, the method according includes the further step of cutting a groove such that first and second side surfaces of the groove is formed; such the first and second side surfaces of the groove are perpendicular to the rotational axis and such that a distance between the first and second side surfaces is equal to the insert width.

The groove formed by the method is thus such that that first and second side surfaces, or wall surfaces, of the groove is formed. The first and second side surfaces of the groove are located in or extend in parallel planes perpendicular to the rotational axis. A shortest distance between the first and second side surfaces is equal to the insert width. The groove is limited by the first and second side surfaces and a bottom surface of the groove. The bottom surface of the groove connects the first and second side surfaces of the groove. The groove opens in a direction opposite to the bottom of the groove. Even if a parting or parting-off operation is performed, during the machining or cutting a groove is formed.

According to an embodiment, the method according includes the further step of selecting the insert such that the insert comprises a top surface and an opposite bottom surface, a front surface and an opposite rear surface, a first side surface and an opposite second side surface; positioning the insert such that the front surface is facing the feed direction and such that the bottom surface is facing the machine interface; arranging the insert such that the main cutting edge is formed along an intersection between the front surface and the top surface; and selecting the insert such that a distance between the front surface and the rear surface is less than a distance from the peripheral surface of the work piece to the rotational axis.

The insert thus comprises a top surface, comprising a rake face and preferably chip breaking or chip control means, and an opposite bottom surface. The top surface is facing away from the machine interface. The bottom surface is facing towards the machine interface. Further the insert comprises a front surface, facing the feed direction and the bottom surface of the groove, and an opposite rear surface. The main cutting edge is formed at an intersection or border between the top surface and the front surface of the insert. The insert further comprises a first side surface and an opposite second side surface. The first side surface of the insert is facing the first side surface of the groove. The second side surface is facing the second side surface of the groove.

According to an embodiment, the method according includes the further step of moving the grooving tool such that the insert is completely inside the groove.

By such a method, deeper grooving may be performed.

According to an embodiment, the method according includes the further step of moving the grooving tool such that a second mid-plane of the blade portion moves closer to the rotational axis, wherein the second mid-plane of the blade portion is equidistantly or substantially equidistantly between the opposite third and fourth surfaces.

According to an embodiment, the method according includes the further step of arranging the grooving tool such that the main cutting edge is parallel to or substantially parallel to the rotational axis.

The main cutting edge is substantially parallel to the rotational axis if the main cutting edge is within +/−15 degrees from being parallel to the rotational axis.

According to an embodiment, the method according includes the further step of arranging the grooving tool such that the blade portion is more elongated in a first direction parallel to the tangential cutting force than in a second direction; where the second direction is perpendicular to the tangential cutting force and perpendicular to the rotational axis.

By such a method, vibrations may be reduced without adding weight to the blade portion.

According to an embodiment, the method according includes the further steps of selecting the grooving tool such that the blade portion comprises:

opposite first and second surfaces, wherein the blade width is defined as a shortest distance between the first and second surfaces;

opposite third and fourth surfaces; a fifth surface and an opposite blade portion end, wherein the blade width is constant or substantially constant from the fifth surface up to the blade portion end; an insert seat separating the third surface and the fifth surface; selecting the grooving tool such that the insert comprises a rake face, and a main clearance surface; positioning the insert in the insert seat such that the main clearance surface and the third surface are facing the same direction; and arranging the blade portion such that a shortest distance from the fifth surface to the opposite blade portion end is greater than a shortest distance from the third surface to the fourth surface.

According to an embodiment, the method includes the further steps of selecting the grooving tool such that the grooving tool comprises a coupling portion suitable to be connected to a machine interface; and connecting the coupling portion to a machine interface of a machine tool.

According to an embodiment, the method includes the further steps of selecting the grooving tool such that the grooving tool comprises a coupling portion suitable to be connected to a machine interface, and connecting the coupling portion to a machine interface of computer numerical control lathe.

A computer numerical control lathe, also known as a computerized numerical control lathe, or CNC-lathe, is a machine tool which can be used for turning, and where the movement of a turning tool, such as a grooving tool, is controlled by a computer program.

According to an embodiment, the method includes the further steps of selecting the grooving tool such that the grooving tool comprises a tool block, arranging the tool block such that the tool block comprises a coupling portion suitable to be connected to a machine interface, and arranging the grooving tool such that a distance between the coupling portion and the blade portion can be chosen over a continuous range.

By such a method, the blade overhang can be selected over a range of distances, which is an advantage if e.g. work pieces having different diameters is to be cut off. In such cases, the blade overhang may be chosen as small as necessary for each of the work pieces.

The overhang is defined as the distance between the main cutting edge and the closest interfering portion of the tool block. In other words, the overhang defines the maximum grooving depth.

The distance between the coupling portion and the blade portion can be chosen over a continuous range, which is preferably realized by allowing the blade portion to be linearly slideable in the tool block in an un-clamped state. The tool block preferably comprises clamping means which allow the blade portion to be alternatively clamped and un-clamped to the tool block. The linearly slideable direaction of the blade portion in the tool block is preferably towards the machine interface.

According to an embodiment, the method includes the further step of selecting the grooving tool such that the blade portion comprises opposite and parallel third and fourth surfaces.

By arranging the third and fourth surfaces of the blade portion parallel, the blade portion can be slideable in the tool block in an improved manner.

Preferably the third and fourth surfaces are clamping surfaces. In other words, preferably the third and fourth surfaces are in contact with clamping means of the tool block.

An aspect of the invention relates to an insert for use in the method.

According to an aspect of the invention, a computer program has instructions which when executed by a computer numerical control lathe cause the computer numerical control lathe to perform the method.

According to an aspect of the invention, a computer readable medium having stored thereon a computer program.

According to an aspect of the invention, a data stream is representative of a computer program.

DESCRIPTION OF THE DRAWINGS

The present invention will now be explained in more detail by a description of different embodiments of the invention and by reference to the accompanying drawings.

FIG. 6 is a side view of the blade portion in FIG. 5.

FIG. 7 is a front view of the blade portion in FIG. 6.

FIG. 8 is a view of section B-B in FIG. 6.

FIG. 9 is a top view of a machining method using a blade portion according to a first type.

Figure 1:
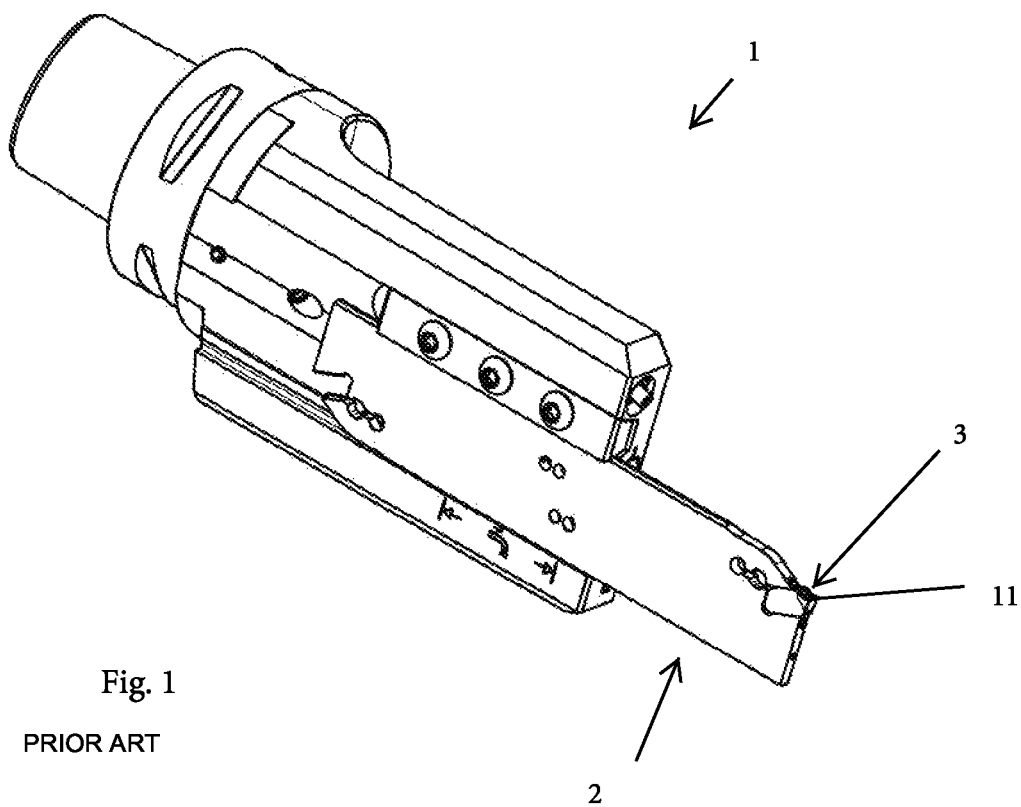
FIG. 1 is a perspective view of a state of the art grooving tool including a blade portion and an insert.
Figure 2:
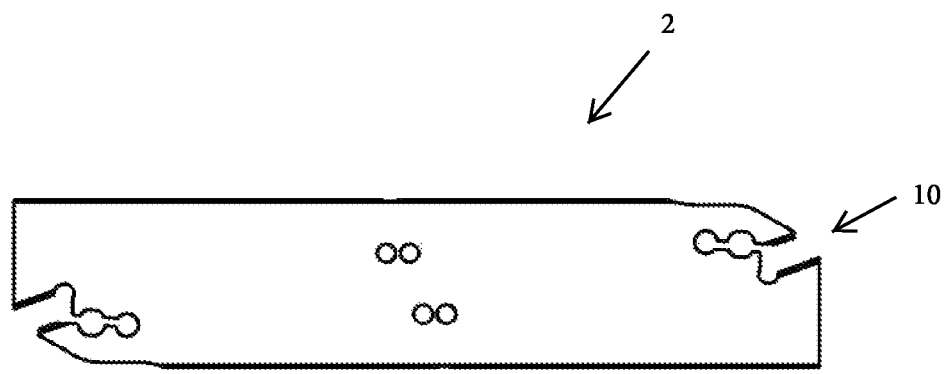
FIG. 2 is a side view of the blade portion in FIG. 1.
Figure 3:
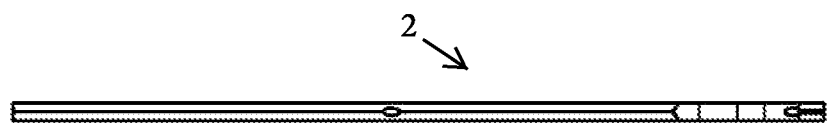
FIG. 3 is a top view of the blade portion in FIG. 2.
Figure 4:
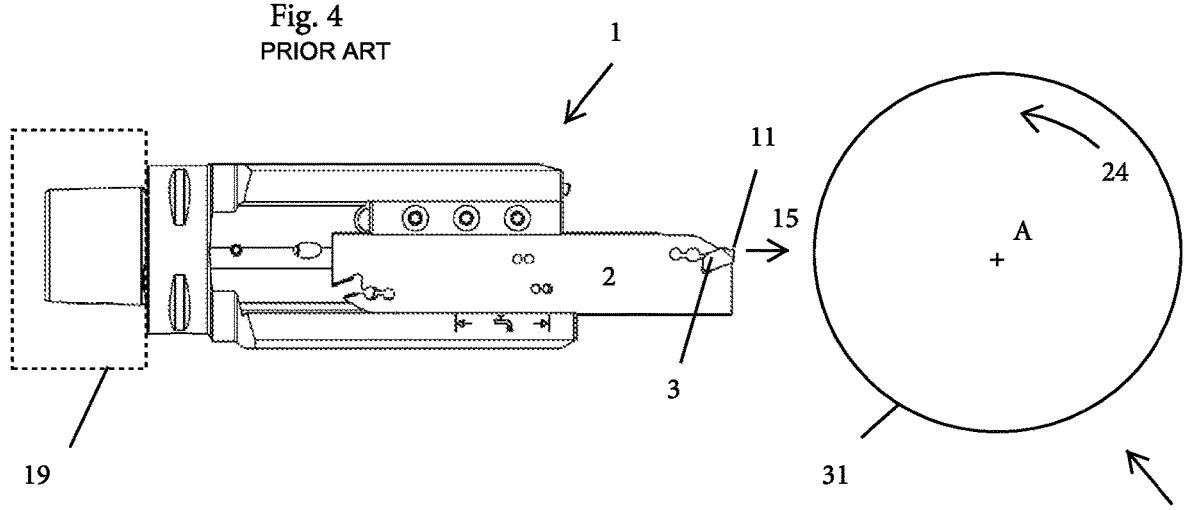
FIG. 4 is a side view of a state of the art machining method using the grooving tool in FIG. 1.

All figures except FIG. 9 have been drawn to scale.

DETAILED DESCRIPTION OF EMBODIMENTS OF THE INVENTION

Reference is made to FIGS. 1-4 which show a state of the art grooving tool 1, a state of the art blade portion 2, a state of the art insert 3 mounted in an insert seat 10 of the blade portion 2. During a cutting operation, such as a grooving or parting or cutting-off operation, the grooving tool 1 is connected to a machine interface 19 and moved in a feed direction 15 towards a rotational axis A of a metal work piece 18. The work piece 18 rotates around the rotational axis A thereof in a rotational direction 24. A main cutting edge 11 of the insert 3 cuts a groove in the peripheral surface 31 of the work piece 18. A tangential cutting force (not shown) is directed downwards in FIG. 4.

Reference is now made to FIG. 5-9, which show a blade portion 2 according to a first type and a method according to an embodiment. The grooving tool 1 comprises a blade portion 2 having a constant or substantially constant blade width 13, and an insert 3 having a maximum insert width 14 defined by a main cutting edge 11. The insert width 14 is greater than the blade width 13. The grooving tool 1 comprises a tool block 30. The grooving tool 1 is connected to a machine interface 19 of a machine tool (not shown). More precisely, the tool block 30 comprises a coupling portion 32 connected to the machine interface 19.

The blade portion 2 comprises opposite first and second surfaces 4, 5. The blade width 13 is defined as a shortest distance between the first and second surfaces 4, 5. The blade portion 2 comprises opposite third and fourth surfaces

8, 9. The blade portion comprises a fifth surface 6 and an opposite blade portion end 7. The blade width 13 is constant or substantially constant from the fifth surface 6 up to the blade portion end 7. A shortest distance 16 from the fifth surface 6 to the opposite blade portion end 7 is greater than a shortest distance 17 from the third surface 8 to the fourth surface 9. The blade portion end 7 is a blade portion end surface 7. The blade portion 2 is a singular body limited by the opposite first and second surfaces 4, 5, the opposite third and fourth surfaces 8, 9, and the opposite fifth and blade portion end surfaces 6, 7. The distance 16 from the fifth surface 6 to the opposite blade portion end 7 is 3-8 times greater than a distance 17 from the third surface 8 to the fourth surface 9. The distance 17 from the third surface 8 to the fourth surface 9 is 5-20 times greater than the blade width 13. The opposite first and second surfaces 4, 5 are parallel or substantially parallel. The insert seat 10 is arranged such that the inherent elasticity of the blade portion 2 is utilized to clamp an insert 3 in the insert seat 10.

The opposite third and fourth surfaces 8, 9 are parallel or substantially parallel in a side view as seen in FIG. 6. As seen in e.g. FIG. 8, the third surface 8 comprises a sixth surface 20 and a seventh surface 21, and the fourth surface 9 comprises an eighth surface 22 and a ninth surface 23. The sixth surface 20 and the seventh surface 21 in a cross section converge towards a first mid-plane 41 located equidistantly between the opposite first and second surfaces 4, 5. The eighth surface 22 and the ninth surface 23 in a cross section converge towards the first mid-plane 41. A distance between the third and fourth surfaces 8, 9 is greatest in the first mid-plane 41.

The insert seat 10 separates the third surface 8 and the fifth surface 6. A second mid-plane 42 of the blade portion 2 is equidistantly or substantially equidistantly between the opposite third and fourth surfaces 8, 9.

The insert 3 comprises a main cutting edge 11, an associated rake face 12, and an associated main clearance surface 25. The main cutting edge 11 defines an insert width 14. The insert width 14 is greater than the blade width 13. The insert 3 comprising a top surface 26 and an opposite bottom surface 27, a front surface 28 and an opposite rear surface 29, a first side surface 39 and an opposite second side surface 40. The top surface 26 comprises the rake face. The front surface 28 comprises the main clearance surface 25;

The insert 3 is removably clamped, seated or mounted in the insert seat 10. When the insert 3 is mounted in the insert seat 10, the main clearance surface 25 and the third surface 8 are facing in the same direction 15, i.e. the feed direction 15. The main clearance surface 25 of the insert 3 and the third surface 8 of the blade portion are facing in the same direction 15 or in substantially the same direction 15. When the insert 3 is mounted in the insert seat 10, a portion of the bottom surface 27 and a portion of the rear surface 29 is in contact with the insert seat 10. A plane parallel to the second mid-plane 42 intersect the top and bottom surfaces 26, 27 of the insert 3. When the insert 3 is mounted in the insert seat 10, the main cutting edge 11 is arranged symmetrically in relation to a first mid-plane 41 equidistantly or substantially equidistantly between the opposite first and second surfaces 4, 5, and the fifth surface 6 is facing in a direction which is opposite in relation to the coupling portion 32.

Figure 5:
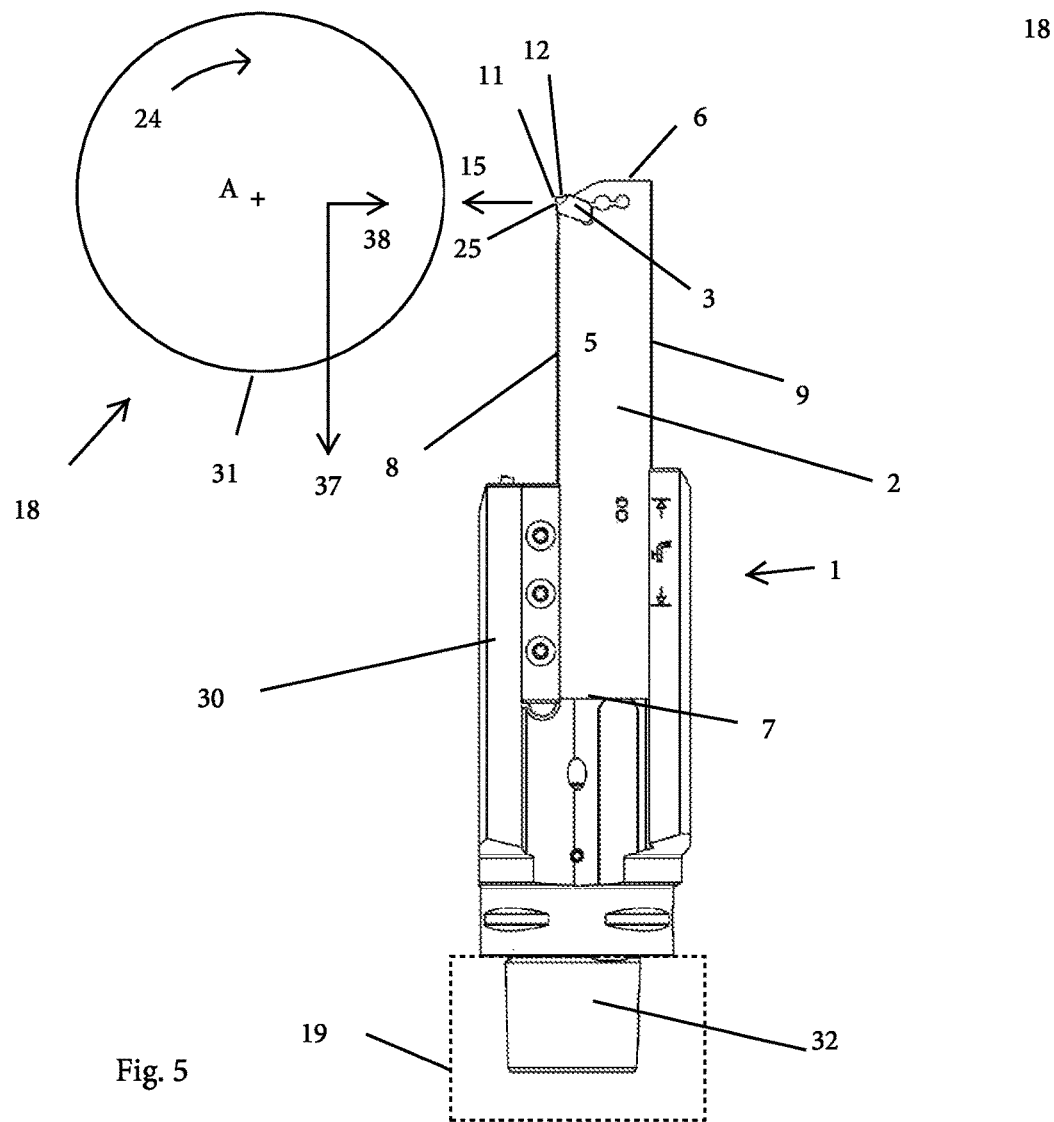
FIG. 5 is a side view of a machining method according to a first embodiment using a first type of grooving tool comprising a blade.

A portion of the third surface 8 and a portion of the fourth surface 9 of the blade portion 2 is in contact with the tool block 30. The blade portion 2 is clampable to the tool block 30 such that a distance between the coupling portion 32 and the blade portion 2 can be chosen over a continuous range. As seen in FIGS. 5 and 9, a metallic work piece 18 having a peripheral surface 31 rotates about a rotational axis A thereof in a rotational direction 24.

A groove 33 having a predetermined groove width equal to the insert width 14, or the width of the main cutting edge 11, is cut in the work piece 18 by moving the tool 1 in a feed direction 15 towards the rotational axis A of the work piece 18. The groove width is equal to or substantially equal to the insert width 14. A tangential cutting force 37 is directed towards or substantially towards the machine interface 19. A radial cutting force 38 is directed in an opposite direction relative to the feed direction 15.

In e.g. parting off or cutting off of a solid bar work piece 18, the feed of the grooving tool 1 continues such that the main cutting edge 11 intersects or substantially intersects the rotational axis A. FIG. 9 may show a situation prior to the actual parting off, where the main cutting edge 11 have not yet intersected the rotational axis A, and where a bottom surface 36 of the groove 33 connects first and second side surfaces 34, 35 of the groove 33. The first and second side surfaces 34, 35 of the groove 33 are perpendicular to the rotational axis A. A distance between the first and second side surfaces 34, 35 is equal to the insert width 14. During cutting, the main cutting edge 11 is moved along a straight path towards the rotational axis A. In FIG. 9, the insert 3 is completely inside the groove 33. During cutting, the second mid-plane 42 of the blade portion 2 moves closer to the rotational axis A.

During cutting, the blade portion 2 is more elongated in a first direction parallel to the tangential cutting force 37 than in a second direction, perpendicular to the tangential cutting force 37 and perpendicular to the rotational axis A.

Figure 10:
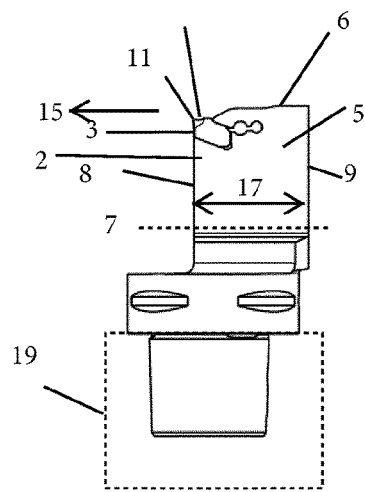
FIG. 10 is a side view of a grooving tool according to a second type.
Figure 11:
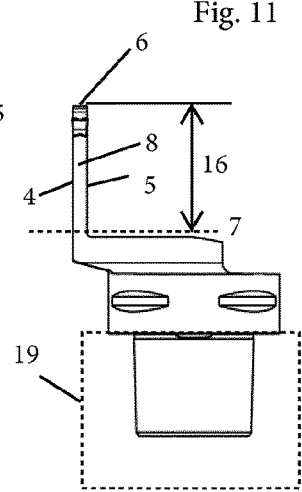
FIG. 11 is a front view of the grooving tool in FIG. 10.
Figure 12:
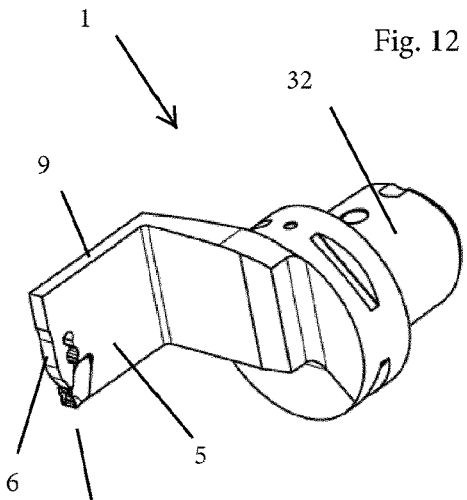
FIG. 12 is a perspective view of the grooving tool in FIG. 10.

Reference is now made to FIGS. 10-12, which show a grooving tool 1 according to a second type. The blade portion 2 is part of the grooving tool 1. In other words, the blade portion 2 is permanently connected to a rear portion of the grooving tool 1, which rear portion comprises a coupling portion 32, which coupling portion 32 conical and is connectable to a machine interface 19. The blade portion rear end 7 is thus not in the form of a rear end surface, but rather in the form of a border separating the blade portion 2 having a blade width 13, and a rear portion have a width greater than the blade width. The blade portion 2 is thus not moveable in a tool block as according to the first type. Thus, according to the second type, the maximum grooving depth is fixed. The distance 16 from the fifth surface 6 to the opposite blade portion end 7 is about 10-50% greater than a distance 17 from the third surface 8 to the fourth surface 9. In all other substantial aspects, the blade portion 2 is similar to or identical to the blade portion according to the first type. The insert 3 is identical to the insert 3 described above. The grooving tool 2 can be used in the method described above.

Figure 13:
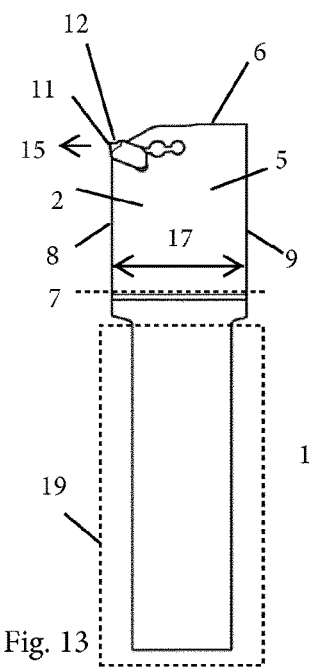
FIG. 13 is a side view of a grooving tool according to a third type.
Figure 14:
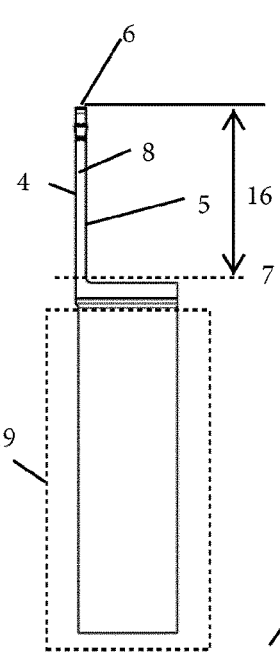
FIG. 14 is a front view of the grooving tool in FIG. 13.
Figure 15:
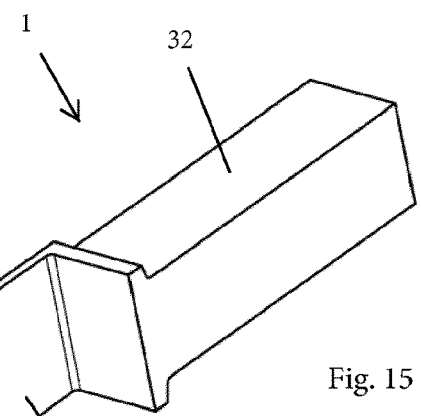
FIG. 15 is a perspective view of the grooving tool in FIG. 13.
Figure 16:
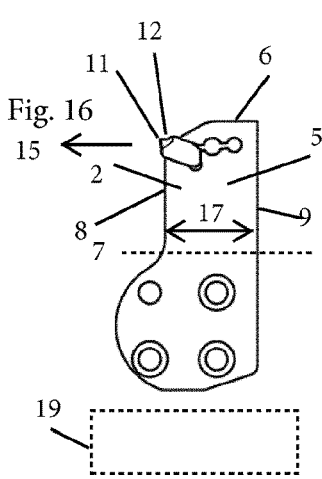
FIG. 16 is a side view of a grooving tool portion according to a fourth type.
Figure 17:
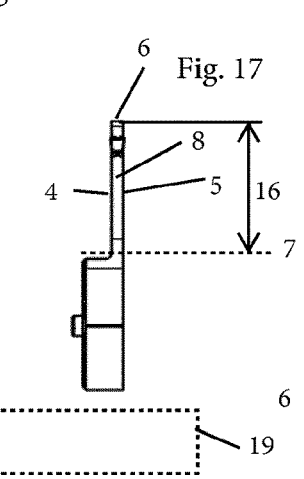
FIG. 17 is a front view of the grooving tool portion in FIG. 16.
Figure 18:
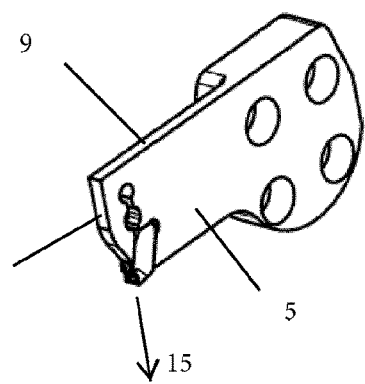
FIG. 18 is a perspective view of the grooving tool portion in FIG. 16.

Reference is now made to FIGS. 13-15, which show a grooving tool 1 according to a third type. The grooving tool 1 according to the third type differ to the grooving tool 1 according to the second type only in that the coupling portion is of shank type or square-shank type. In other words, the coupling portion 32 is square shaped or rectangular shaped in a cross section. The coupling portion 32 may also have other shapes, depending on the configuration of the machine interface 19 to which the coupling portion 32 is connected.

Reference is now made to FIGS. 13-15, which show a grooving tool portion according to a fourth type. The grooving tool portion comprises a blade portion 2 as described in type two and three. The grooving tool portion is connectable to a second or rear or intermediate grooving tool portion (not shown), which is connectable to a machine interface 19.

As described, different types of grooving tools may be used in order to perform the method. The skilled person may find other grooving tools, comprising a blade portion, which can be used in order to perform the method.

The machine tool (not shown) is preferably a CNC machine, which can be instructed to perform the described grooving or cutting operation by instructions in a computer program, a computer readable medium or a data stream.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The invention claimed is:

1. A method for cutting a groove of a predetermined groove width in a work piece, the method comprising the steps of:
   providing a metallic work piece having a peripheral surface;
   providing a grooving tool including a blade portion having a constant or substantially constant blade width, the blade portion being a singular body, and an insert directly seated to the blade portion and having a maximum insert width defined by a main cutting edge;
   selecting the insert width to be greater than the blade width;
   connecting the grooving tool to a machine interface of a machine tool;
   rotating the work piece about a rotational axis thereof in a rotational direction;
   cutting a groove in the work piece by moving the tool in a feed direction towards the rotational axis of the work piece such that the groove width is equal to or substantially equal to the insert width and such that a tangential cutting force is directed towards or substantially towards the machine interface;
   arranging the grooving tool such that a maximum first distance of the blade portion is more elongated in a first direction parallel to the tangential cutting force than a maximum second distance in a second direction, the second direction being perpendicular to the tangential cutting force and perpendicular to the rotational axis, wherein a longitudinal central axis of the grooving tool is parallel to the tangential direction;
   selecting the grooving tool such that the grooving tool includes a tool block;
   arranging the tool block such that the tool block includes a coupling portion arranged to be connected to the machine interface; and
   arranging the grooving tool such that the blade portion is linearly slideable in the tool block in an un-clamped state along the first direction.

2. The method according to claim 1, further comprising the step of moving the tool such that the main cutting edge intersects or is moved within 2 mm of the rotational axis.

3. The method according to, claim 1, further comprising the step of moving the tool such that the main cutting edge is moved along a straight path towards the rotational axis.

4. The method according to claim 1, further comprising the step of cutting the groove such that first and second side surfaces of the groove are formed, such the first and second side surfaces of the groove are perpendicular to the rotational axis, and such that a distance between the first and second side surfaces is equal to the insert width.

5. The method according to claim 1, further comprising the steps of:
   selecting the insert such that the insert includes a top surface and an opposite bottom surface, a front surface and an opposite rear surface, a first side surface and an opposite second side surface;
   positioning the insert such that the front surface is facing the feed direction and such that the bottom surface is facing the machine interface;
   locating the main cutting edge at an intersection between the front surface and the top surface; and
   selecting the insert such that a distance between the front surface and the rear surface is less than a distance from the peripheral surface of the work piece to the rotational axis.

6. The method according to claim 1, further comprising the step of moving the grooving tool such that the insert is completely inside the groove.

7. The method according to claim 1, further comprising the step of moving the grooving tool such that a mid-plane of the blade portion moves closer to the rotational axis, the blade portion including opposite first and second surfaces and opposite third and fourth surfaces, wherein the mid-plane of the blade portion is equidistant or substantially equidistant between the opposite third and fourth surfaces.

8. The method according to claim 1, further comprising the step of arranging the grooving tool such that the main cutting edge is parallel to or substantially parallel to the rotational axis.

9. The method according to claim 1, further comprising the steps of:
   selecting the grooving tool such that the blade portion includes opposite first and second surfaces, wherein the blade width is defined as a shortest distance between the first and second surfaces; opposite third and fourth surfaces; a fifth surface and an opposite blade portion end, wherein the blade width is constant or substantially constant from the fifth surface up to the blade portion end; and an insert seat separating the third surface and the fifth surface;
   selecting the grooving tool such that the insert comprises a rake face, and a main clearance surface;
   positioning the insert in the insert seat such that the main clearance surface and the third surface are facing the same direction; and
   arranging the blade portion such that a shortest distance from the fifth surface to the opposite blade portion end is greater than a shortest distance from the third surface to the fourth surface.

10. The method according to claim 1, further comprising the steps of selecting the grooving tool such that the grooving tool includes a coupling portion suitable to be connected to the machine interface; and connecting the coupling portion to the machine interface of the machine tool.

11. The method according to claim 1, wherein the machine tool is a computer numerical control lathe, the method further comprising the steps of selecting the grooving tool such that the grooving tool includes a coupling portion suitable to be connected to the machine interface; and connecting the coupling portion to the machine interface of the computer numerical control lathe.

12. The method according to claim 1 further comprising the step of selecting the grooving tool such that the blade portion includes opposite first and second surfaces and opposite and parallel third and fourth surfaces.

\* \* \* \* \*